United States Patent Office 3,746,751
Patented July 17, 1973

3,746,751
1-(3-CHLORO-4-CYCLOALKYLPHENYL)-CYCLO-
ALKYL-1-CARBOXYLIC ACIDS
Shunsaku Noguchi, Minoo, Osaka, Mikihiko Obayashi,
Suita, Osaka, Isao Minamida, Kyoto, Shoji Kishimoto,
Suita, Osaka, and Kiyohisa Kawai, Kyoto, Japan, as-
signors to Takeda Chemical Industries, Ltd., Osaka,
Japan
No Drawing. Filed July 3, 1969, Ser. No. 839,065
Claims priority, application Japan, July 4, 1968,
43/46,771; Jan. 13, 1969, 44/2,507; Jan. 18,
1969, 44/3,658
Int. Cl. C07c 63/00, 121/60; A61k 27/00
U.S. Cl. 260—515 A                     6 Claims ABSTRACT OF THE DISCLOSURE
Compounds of the formula

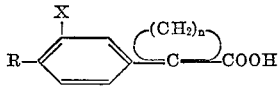

wherein X is hydrogen or halogen, R is an alkyl group of 3–6 carbons and $n$ is an integer of 2 to 5 and their pharmaceutical acceptable salts are provided herein. These compounds have excellent anti-inflammatory, analgesic and antipyretic properties and low toxicity.

---

The present invention relates to novel cycloalkane carboxylic acid derivatives having a strong anti-inflammatory action and low toxicity and also relates to a process for the production of these derivatives.

Hithertofore, there have been synthesized many kinds of so-called non-steroidal anti-inflammatory agents, among which "ibufenac" (p-isobutylphenyl acetic acid) has most widely been put into practical use. However, ibufenac is still unsatisfactory in its anti-inflammatory action and toxicity.

The present inventors have made extensive studies for researching a non-steroidal anti-inflammatory agent which has much higher anti-inflammatory action and far lower toxicity than ibufenac.

The present invention is the culmination of the studies.

Thus, the principal object of the present invention is to provide novel compounds useful for a non-steroidal anti-inflammatory agent of low toxicity and high anti-inflammatory action. Another object is to provide a method for the production of these novel compounds.

The novel compounds of the present invention are those represented by the general formula

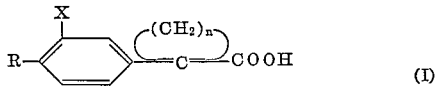

(wherein X is hydrogen or halogen, R is an alkyl having 3 to 6 carbon atoms and $n$ is an integer of 2 to 5) or its pharmaceutically acceptable salts or derivatives derived by conversion of the carboxylic group.

The compounds of the general Formula I have much higher anti-inflammatory action and far lower toxicity in comparison with ibufenac, and further these compounds have analgetic action and antipyretic action. Therefore, the present compounds can be used as an anti-inflammatory agent more advantageously and safely than ibufenac, and moreover can be used also as analgetic agent and antipyretic agent.

In the general Formula I, X is hydrogen or halogen such as chlorine, bromine, fluorine, etc., R is an alkyl having 3 to 6, preferably 4 to 6, carbon atoms such as linear alkyls (e.g. propyl, isopropyl, butyl, secondary butyl, tertiary butyl, hexyl, etc.) and cycloalkyls (e.g. cyclopentyl, cyclohexyl, etc.), and $n$ is an integer of 2 to 5, preferably 2 to 4. Among the halogens represented by the symbol X, chlorine is desirable, and, as the alkyls of the symbol R, alkyls having 4 to 6 carbon atoms are preferable and, among them, isobutyl and cyclohexyl are most desirable. The derivatives derived from the Compound I by conversion of the carboxylic group includes, for example, the corresponding carboxylic amides, hydroxamic acids and carboxylic acid esters such as alkyl esters (e.g. methyl-, ethyl-, propyl-, butyl-, hexyl-, cyclohexyl-, cyclopentyl esters, etc.), aryl esters (e.g. phenyl ester, etc.), aralkyl esters (e.g. benzyl ester, etc.) and aminoalkyl esters (e.g. dimethylaminoethyl-, diethyl-aminoethyl esters, etc.). The salts of the Compound I are mentioned by, for example, metal salts, such as alkali and alkaline earth metal salts (e.g. sodium, potassium, lithium, calcium, barium, magnesium salts, etc.) and organic base salts (e.g. methylamine, ethylamine, butylamine, dimethylamine, diethylamine, pyridine, collidine, quinoline, piperidine, piperazine, pyrrolidine, morpholine, ethanolamine, methyl ethanolamine, butyl ethanolamine, ethyl ethanolamine, dimethyl ethanolamine, diethyl ethanolamine, dibutyl ethanolamine salts, etc.).

Typical compounds of the Formula I are exemplified as below:

1-(3-chloro-4-cyclohexylphenyl)cyclopropane-1-
carboxylic acid
1-(3-chloro-4-cyclopentylphenyl)cyclopropane-1-
carboxylic acid
1-(3-chloro-4-iso.-butylphenyl)cyclopropane-1-
carboxylic acid
1-(3-chloro-4-n-propylphenyl)cyclopropane-1-
carboxylic acid
1-(3-chloro-4-iso-propylphenyl)cyclopropane-1-
carboxylic acid
1-(3-chloro-4-n-hexylphenyl)cyclopropane-1-
carboxylic acid
1-(4-cyclohexylphenyl)cyclopropane-1-carboxylic acid
1-(4-iso.-butylphenyl)cyclopropane-1-carboxylic acid
1-(3-chloro-4-cyclohexylphenyl)cyclobutane-1-
carboxylic acid
1-(3-chloro-4-iso.-butylphenyl)cyclobutane-1-
carboxylic acid
1-(3-chloro-4-n-propylphenyl)cyclobutane-1-
carboxylic acid
1-(4-cyclohexylphenyl)cyclobutane-1-carboxylic acid
1-(4-iso.-butylphenyl)cyclobutane-1-carboxylic acid
1-(3-chloro-4-cyclohexylphenyl)cyclopentane-1-
carboxylic acid
1-(3-chloro-4-iso.-butylphenyl)cyclopentane-1-
carboxylic acid
1-(3-chloro-4-cyclohexylphenyl)cyclohexane-1-
carboxylic acid
1-(3-chloro-4-iso.-butylphenyl)cyclohexane-1-
carboxylic acid
1-(3-chloro-4-n-propylphenyl)cyclohexane-1-
carboxylic acid
1-(4-cyclohexylphenyl)cyclohexane-1-carboxylic acid
1-(4-iso.-butylphenyl)cyclohexane-1-carboxylic acid and salts thereof or derivatives derived by conversion of the carboxylic group thereof.

The present compounds of the Formula I may be prepared, for example, by the process which comprises subjecting a compound of the formula

(wherein R has the same meaning as above) to a reaction with a compound of the formula $X'—(CH_2)_n—X'$  (III)

(wherein X' is halogen and n is an integer of 2 to 5), after or before this reaction, if desired, the compound of the Formula II being subjected to halogenation, and then subjecting the product to hydrolysis.

The reaction schema involved in the process is described below:

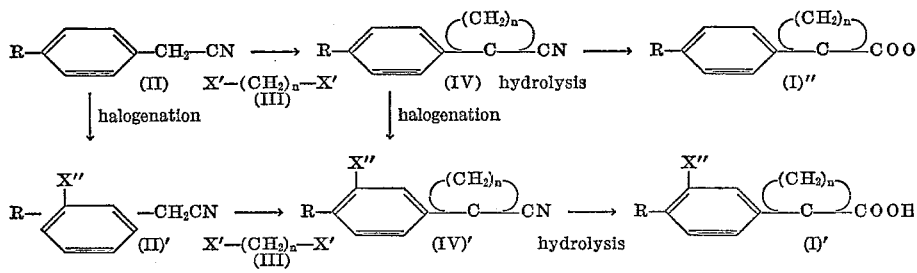

(wherein R, X, X' and n have the same meaning as above and X" is halogen)

Thus, the compound of the Formula I wherein X is hydrogen (i.e. the compound of the Formula I" may be prepared by at first reacting the compound of the Formula II with the compound of the Formula III and then subjecting thus prepared compound IV to hydrolysis. On the other hand, the compound of the Formula I wherein X is halogen (i.e. the compound of the Formula I' may be prepared by (A) at first reacting the Compound II with the Compound III to produce the Compound IV, then subjecting the compound IV to halogenation to produce the Compound IV', and finally subjecting the Compound IV' to hydrolysis or (B) at first subjecting the Compound II to halogenation to produce the Compound II', then reacting the Compound II' with the Compound III to produce the Compound IV' and finally subjecting the Compound IV' to hydrolysis.

A halogenating agent employable in the halogenation of the Compound II to the Compound II' is exemplified by halogen gases and halogen solutions in an organic solvent. The halogenation may be carried out in the presence of an organic solvent. The organic solvent employable for the reaction includes, for example, carbon tetrachloride, chlorofrom, dichloro ethylene, methylene chloride and carbon disulfide, etc. When the halogen solution in an organic solvent is used for the halogenating agent, it is desirable to use, as the solvent for dissolving the halogen, the same one as that to be used in the halogenation reaction. The halogenation is preferably conducted at room temperature or under cooling, but may be done under slightly heating, if desired. It is preferable that the halogenation is conducted under the presence of catalysts. As the catalysts, the use is desirably made of those accelerating an ion-reaction of halogen atom, which are exemplified by metal halides such as aluminum chloride, ferric chloride, zinc chloride, antimony trichloride, antimony pentachloride, and boron trifluoride, etc. An amount of the catalyst is at least one mole equivalent to the starting material, preferably one mole equivalent or a slight excess to the starting material. Practically, the halogenation is carried out by adding dropwise a halogen solution in an organic solvent or blowing a halogen gas into the starting material dissolved in an organic solvent, in the presence of the afore-stated catalyst at room temperature or under cooling.

The halogenated product may be separated out and purified by a conventional manner such as distillation, but the whole halogenated substance may directly be subjected to the subsequent process without conducting separation or purification, so far as the subsequent reaction is not affected adversely.

The halogenated products of the Formula II' are novel compounds and can be used as an intermediate for various kinds of chemical compounds including the object Compound I' of the present invention.

The compound of the Formula III to be reacted with the Compound II or II' are mentioned by ethylene dichloride, ethylene dibromide, α-chloro-β-bromoethane, trimethylene dichloride, butylene dibromide and α-chloro-ε-bromopentane, etc.

In the reaction of the Compound II' with the Compound III, the latter is used in an amount of at least one mole per mole of the former, preferably one mole or a few more to one mole of the Compound II'. The reaction is conducted by contacting these compounds with each other in the presence of a solvent which is exemplified by methanol, ethanol, ethylether, benzene, toluene, dimethylformamide, dimethyl-sulfoxide and liquid ammonia, etc. The use of a basic condensation agent in this reaction is generally desirable. The basic condensation agent employable includes, for example, alkaline or alkaline earth metals (e.g. sodium, potassium, lithium, barium, etc.), their hydroxides, their alcoholates (e.g. methanolates, ethanolates, etc.), their amides, their hydrides, triphenylmethyl salts thereof, alkylamines (e.g. methylamine, ethylamine, etc.) and magnesium alcoholates (e.g. methanolate, ethanolate, etc.). The reaction may proceed at room temperature, under cooling or under heating.

The reaction product may be separated out or purified after a conventional manner such as extraction and distillation, but the whole reaction product may be directly subjected to the subsequent process without conducting separation and purification, so far as the subsequent reaction is not affected adversely.

The reaction of the Compound II with the Compound III and the halogenation of the Compound IV can be conducted after the same manners as described in the reaction of the Compound II' with the Compound III and in the halogenation of the Compound II, respectively.

Thus produced Compound IV and Compound IV' are converted to the Compound I" and the Compound I', respectively, by hydrolysis. The hydrolysis may be conducted after a conventional manner, for instance, by keeping the starting material at room temperature in the presence of a solvent and an acid or alkaline substance. The solvent usable may be mentioned by, for example, lower alkanols (e.g. methanol, ethanol, butanol, etc.) and polyhydric alcohols (e.g. ethylene glycol, diethylene glycol, propylene glycol, glycerol, etc.). The acid substance includes, for example, inorganic acids (e.g. hydrochloric acid, sulfuric acid, etc.), and the alkaline substance includes, for example, alkaline or alkaline earth metals (e.g. sodium, potassium, lithium, barium, calcium, etc.), their hydroxides, and their alcoholates (e.g. methanolate, ethanolate, etc.).

The hydrolysed product can be separated out and purified after a conventional manner such as crystallization, extraction, recrystallization and column chromatography.

Among the present Compounds I, those wherein n is 2, i.e. compounds of the formula

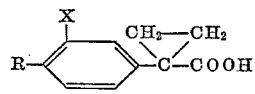

(R and X have the same meaning as above), can be produced also by the following method; namely, process comprising allowing diazomethane to act upon a compound of the general Formula V

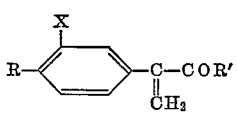

(wherein R and X have the same meaning as above and COR' is a residue of carboxylic acid, carboxylic acid ester, carboxylic amide, carboxylic acid salt, and hydroxamic acid groups) to produce a compound of the general Formula VI $$\text{(VI)}$$

(wherein the symbols have the same meaning as above), and then subjecting thus produced Compound VI to a denitrification reaction.

The starting compound of the Formula V may be prepared by heating the corresponding α-hydroxypropionic acid derivative of the formula

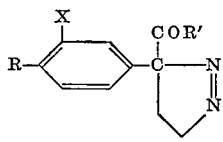

in the presence or absence of a dehydrating agent such as sulfuric acid and p-toluene sulfonic acid.

In the first step of the process for the production of the object compound, diazomethane may directly be allowed to react with the Compound V, or alternatively a compound capable of generating diazomethane upon reaction may be used for the reaction with the Compound V, such compound as mentioned just above being exemplified by nitrosomethylurea, nitrosomethylurethane, N-nitroso-β-methylaminoisobutyl methyl ketone, nitrosomethyl guanidine, and nitrosomethyl-p-toluene sulfonic acid, etc.

Diazomethane or the compound capable of generating the same is generally used in an amount of about 1 mole or a little more per mole of the Compound V. The reaction is generally conducted at —20 to 50° C. under atmospheric pressure. The reaction can proceed smoothly under the absence of a solvent, but any solvent may be used so far as it does not affect adversely. Solvents employable include, for example, benzene, chloroform, ethylether and tetrahydrofuran.

The reaction product can be separated out and purified by a conventional manner such as concentration, distillation, crystallization, recrystallization and chromatography, but the whole reaction mixture may be directly subjected to the second step (denitrification) without conducting any separation or purification.

The denitrification in the second step may be carried out by subjecting the Compound VI to heating, irradiation with rays, etc. Heating temperature ranges from about 50 to about 200° C., more desirably from about 100 to about 200° C. The rays of the irradiation of the compound include, for example, sun-light, ultraviolet ray, etc.

The denitrification proceeds smoothly even in the absence of a solvent, but inert solvent may be used. The solvent employable is mentioned by, for example, benzene, ethylether, chloroform, carbon tetrachloride, nitrobenzene, xylene and toluene. The denitrified product can be separated out and purified by a conventional manner such as distillation, concentration, crystallization, recrystallization and column chromatography.

When the product obtained after the manners mentioned foregoing is the cycloalkane carboxylic acid derivative of the formula

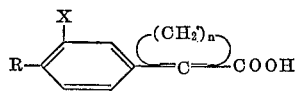

this carboxylic acid derivative may be converted into the corresponding carboxylic amide, carboxylic acid ester, hydroxamic acid, or organic or inorganic acid salts of the corresponding carboxylic acid after a per se known manner.

Owing to the low toxicity and strong effect as anti-inflammatory agent, the cycloalkane carboxylic acid derivatives of the present invention can be administered safely as anti-inflammatory agent or in the form of a pharmaceutically acceptable composition in admixture with a suitable and conventional carrier or adjuvant, administrable orally or by way of injection, without giving harm to the host. The pharmaceutical composition can take the form of tablets, granules, powders, capsules or injections and can be administered orally or subcutaneously or intramuscularly. Usual daily doses of the derivatives lie in the range of about 100 to about 1500, preferably about 200 to about 500 milligrams per human adult.

For further explanation of the present invention, the following examples are given, wherein the word "part(s)" is based on weight unless otherwise noted, and the relation between "weight part" and "volume part" corresponds to that between gram and milliliter.

EXAMPLES—Part I

Preparation of compounds of the formula

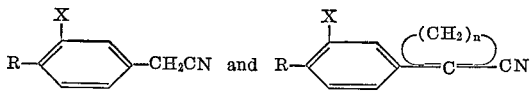

EXAMPLE 1

39.8 parts of 4-cyclohexylphenyl acetonitrile dissolved in 100 volume parts of carbon tetrachloride is mixed with 32.4 parts of ferric chloride under cooling at 10° C. with ice water. To the mixture is dropwise added under stirring 380 parts of carbon tetrachloride containing 3.75 weight percent of chlorine, followed by stirring for 3 hours, and then further added dropwise 127 parts of carbon tetrachloride containing 3.75 weight percent of chlorine, followed by keeping standing for 30 minutes. The resulting mixture is poured into a mixture of 300 volume parts of ice water and 130 volume parts of concentrated hydrohloric acid. The aqueous layer is separated out from the organic layer and extracted with chloroform. The organic layer previously separated out is combined with the chloroform layer, followed by washing with water, an aqueous sodium bicarbonate and water in this order and subjecting to distillation so as to remove the solvent. The residue is subjected to distillation under reduced pressure, whreby 29.6 parts of 3-chloro-4-cyclohexylphenyl acetonitrile is obtained as colorless liquid boiling at 165 to 168° C./2.5 mm. Hg.

*Elementary analysis.*—Calculated for $C_{14}H_{16}NCl$ (percent): C, 71.94; H, 6.90; N, 5.99; Cl, 15.17. Found (percent): C, 71.94; H, 6.81; N, 5.74; Cl, 15.24.

EXAMPLE 2

To 53.5 parts of 4-cyclohexylphenyl acetonitrile dissolved in 200 volume parts of carbon tetrachloride is added 35.6 parts of pulverized anhydrous aluminum chloride. To the mixture is dropwise added 1038 parts of carbon tetrachloride containing 3.65 weight percent of chlorine at 4 to 5° C. under stirring over 20 minutes. followed by stirring for 5 hours. Then, the resultant is treated as in Example 1 to produce 40.0 parts of 3-chloro-4-cyclohexylphenyl acetonitrile.

EXAMPLE 3

To 42.0 parts of 4-cyclohexylphenyl acetonitrile dissolved in 420 volume parts of carbon tetrachloride is added 28.1 parts of pulverized anhydrous aluminum chloride. Into the mixture is blown dry chlorine gas at 0 to 5° C. for 5 hours. The resultant is treated as in Example 1 to give 27.3 parts of 3-chloro-4-cyclohexylphenyl acetonitrile.

EXAMPLE 4

To 41.3 parts of 1-cyano-1-(4-cyclohexylphenyl) cyclopropane dissolved in 200 volume parts of carbon tetrachloride is added 24.5 parts of pulverized anhydrous aluminum chloride. To the mixture is then added dropwise at 5° C. under stirring 695 parts of carbon tetrachloride containing 3.76 weight percent of chlorine, followed by stirring for 6 hours. The resultant is treated as in Example 1 to give 26.7 parts of 1-cyano-1-(3-chloro-4-cyclohexylphenyl)cyclopropane as a colorless liquid boiling at 170 to 172° C./mm. Hg. The liquid is changed into crystals melting at 76 to 77° C. upon keeping it standing.

*Elementary analysis.*—Calculated for $C_{16}H_{18}NCl$ (percent): C, 73.97; H, 6.98; N, 5.39; Cl, 13.65. Found (percent): C, 73.80; H, 6.73; N, 5.65; Cl, 14.00.

EXAMPLE 5

To 41.5 parts of p-isobutylphenyl acetonitrile dissolved in 85 volume parts of anhydrous carbon tetrachloride is added 38.9 parts of anhydrous ferric chloride. To the mixture is added dropwise at 5 to 8° C. under stirring 465 parts of carbon tetrachloride containing 3.65 weight percent of chlorine, followed by stirring for 1.5 hours and then further added 155 parts of carbon tetrachloride containing 3.65 weight percent of chlorine, followed by stirring for 40 minutes. The resultant is treated as in Example 1 to give 36 parts of 3-chloro-4-isobutylphenyl acetonitrile as colorless oil boiling at 132 to 135° C./3.2 mm. Hg.

*Elementary analysis.*—Calculated for $C_{12}H_{14}NCl$ (percent): C, 69.39; H, 6.79; N, 6.74; Cl, 17.07. Found (percent): C, 69.42; H, 6.63; N, 7.11; Cl, 17.25.

EXAMPLES—Part II

Preparation of compounds of the formula

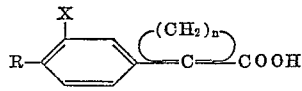

EXAMPLE 6

To a mixture of 0.87 part of 60% sodium hydride and 3 volume parts of dimethylsulfoxide is slowly added under cooling in nitrogen gas streams 2.0 parts of 4-cyclohexyl phenyl acetonitrile in 3 volume parts of dimethylsulfoxide, followed by stirring at room temperature for 30 minutes. To the resultant is dropwise added 2.24 parts of α-chloro-β-bromo-ethane under cooling in nitrogen gas streams, followed by stirring at room temperature for 30 minutes. The whole mixture is poured into ice water, and separated oily substance is extracted with chloroform. The chloroform extract is washed with water, dehydrated over sodium sulfate and subjected to distillation so as to remove chloroform. This procedure gives 2.5 parts of crude 1 - (4 - cyclohexyl-phenyl)-1-cyanocyclopropane, which is then purified by distillation to obtain pure product boiling at 155 to 163° C./1 mm. Hg.

*Elementary analysis.*—Calculated for $C_{16}H_{19}N$ (percent): C, 85.28; H, 8.50; N, 6.22. Found (percent): C, 85.02; H, 8.44; N, 6.43.

A mixture of 6.4 parts of the above obtained 1-(4-cyclohexylphenyl)-1-cyanocyclopropane, 5.0 parts of potassium hydroxide and 45 volume parts of ethylene glycol is heated under reflux for 1 hour in nitrogen gas streams. After cooling, the resultant is poured into ice water and washed with ethyl ether. The mother liquor is acidified with hydrochloric acid and the precipitates are recovered, followed by recrystallizing from a mixture of methylene chloride and hexane. This procedure gives 1-(4-cyclohexylphenyl) cyclopropane - 1 - carboxylic acid melting at 194 to 196° C.

*Elementary analysis.*—Calculated for $C_{16}H_{20}O_2$ (percent): C, 78.65; H, 8.25. Found (percent): C, 78.87; H, 8.09.

EXAMPLE 7

To a mixture of 12.3 parts of 4-cyclohexyl phenyl acetonitrile, 25.0 parts of 1,3-dibromopropane and 30.0 volume parts of dimethylsulfoxide is slowly added with stirring 7.44 parts of 55% sodium hydride under cooling in nitrogen gas streams, followed by stirring at room temperature for 1 hour. The resultant is poured into ice water, and the separated oily substance is extracted with ethyl ether, washed thoroughly with water, dehydrated over sodium sulfate and subjected to distillation so as to remove ethyl ether. This procedure gives 10.88 parts of 1-(4-cyclohexylphenyl)-1-cyanocyclobutane.

10.8 parts of the crude 1-(4-cyclohexylphenyl)-1-cyanocyclobutane obtained above and 7.5 parts of potassium hydroxide are dissolved into 70 volume parts of ethylene glycol and heated under reflux in nitrogen gas streams for 25 hours, at the end of which time the resultant is poured into chilled water, washed with ethyl ether and acidified with hydrochloric acid. Thus separated oily substance is extracted with ethyl ether, washed with water, dehydrated over sodium sulfate, subjected to distillation so as to remove ethyl ether and recrystallized from a mixture of water and ethyl alcohol. This procedure gives 1-(4-cyclohexyl phenyl) cyclobutane-1-carboxylic acid melting at 186 to 189° C.

*Elementary analysis.*—Calculated for $C_{17}H_{22}O_2$ (percent): C, 79,03; H, 8.58. Found (percent): C, 79.35; H, 8.80.

EXAMPLE 8

10.6 parts of 1-(4-cyclohexylphenyl)-1-cyanocyclopentaine is produced after a similar manner to Example 7 by using 11.54 parts of 4-cyclohexyl phenyl acetonitrile, 25.0 parts of 1,4-dibromobutane, 30 volume parts of dimethylsulfoxide and 6.9 parts of 55% sodium hydride.

1(4-cyclohexyl phenyl) cyclopentane-1-carboxylic acid is produced after a similar manner to Example 7 by using 10.6 parts of 1-(4-cyclohexylphenyl)-1-cyanocyclopentane, 7.5 parts of potassium hydroxide and 70 volume parts of ethylene glycol, followed by recrystallizing from ethyl alcohol. Melting point: 225 to 227° C.

*Elementary analysis.*—Calculated for $C_{18}H_{24}O_2$ (percent): C, 79.37; H, 8.88. Found (percent): C, 79.18; H, 9.04.

EXAMPLE 9

To a mixture of 12 parts of sodium hydride and 30 volume parts of dimethylsulfoxide is added dropwise under cooling in nitrogen gas streams 4.5 parts of 3-chloro-4-cyclohexylphenyl acetonitrile in 5 volume parts of dimethylsulfoxide, followed by stirring at room temperature for 30 minutes, and then further added dropwise under cooling 8.4 parts of ethylene bromide, followed by stirring at room temperature for 30 minutes. The resultant is poured into chilled water, and the separated oily substance is extracted with ethyl ether, washed with diluted hydrochloric acid and water in this order and subjected to distillation so as to remove the solvent. This procedure gives 5.1 parts of crude 1-(3-chloro-4-cyclohexylphenyl)-1-cyanocyclopropane, which is then recrystallized from ethyl alcohol. Melting point: 76 to 77° C.

*Elementary analysis.*—Calculated for $C_{16}H_{18}NCl$ (percent): C, 73.97; H, 6.98; N, 5.39; Cl, 13.65. Found (percent): C, 73.80; H, 6.73; N, 5.65; Cl, 14.00.

1-(3-chloro - 4 - cyclohexyl phenyl) cyclopropane-1-carboxylic acid is produced after a similar manner to Example 7 by using 4.8 parts of the above produced 1-(3-chloro-4-cyclohexylphenyl) - 1 - cyanocyclopropane, 3.0 parts of potassium hydroxide and 100 volume parts of ethylene glycol, followed by recrystallizing from a mixture of methylene chloride and hexane. Melting point: 194 to 196° C.

*Elementary analysis.*—Calculated for $C_{16}H_{19}O_2Cl$ (percent): C, 68.93; H, 6.87; Cl, 12.73. Found (percent): C, 68.80; H, 6.94; Cl, 12.73.

EXAMPLE 10

13.0 parts of 1-(3-chloro-4-cyclohexylphenyl)-1-cyanocyclobutane is produced after a similar manner to Example 7 by using 14.5 parts of 3-chloro-4-cyclohexyl phenyl acetonitrile, 25.0 parts of 1,3-dibromopropane, 30 volume parts of dimethylsulfoxide and 7.4 parts of 55% sodium hydride.

1-(3-chloro - 4 - cyclohexyl phenyl)cyclobutane-1-carboxylic acid is produced after a similar manner to Example 7 by using 13.0 parts of the above produced 1-(3-chloro-4-cyclohexylphenyl)-1-cyanocyclobutane, 7.5 parts of potassium hydroxide and 70 volume parts of ethylene glycol, followed by recrystallizing from a mixture of ethyl alcohol and water. Melting point: 142 to 144° C.

*Elementary analysis.*—Calculated for $C_{17}H_{21}O_2Cl$ (percent): C, 69.73; H, 7.23. Found (percent): C, 70.04; H, 7.40.

EXAMPLE 11

10.0 parts of 1-(3-chloro-4-cyclohexylphenyl)-1-cyanocyclopentane is produced after a similar manner to Example 7 by using 9.1 parts of 3-chloro-4-cyclohexyl phenyl acetonitrile, 17.0 parts of 1,4-dichlorobutane, 30 volume parts of dimethylsulfoxide and 4.7 parts of 55% sodium hydride.

1-(3-chloro-4-cyclohexyl phenyl)cyclopentane-1 - carboxylic acid is produced after a similar manner to Example 7 by using 10.0 parts of the above produced 1-(3-chloro-4-cyclohexyl phenyl)-1-cyanocyclopentane, 7.5 parts of potassium hydroxide and 70 volume parts of ethylene glycol, followed by recrystallizing from ethyl alcohol. Melting point: 185 to 186° C.

*Elementary analysis.*—Calculated for $C_{18}H_{23}O_2Cl$ (percent): C, 70.46; H, 7.55. Found (percent): C, 70.78; H, 7.70.

EXAMPLE 12

8.5 parts of 1-(3-chloro-4-isobutylphenyl)-1-cyanocyclopropane is produced after a similar manner to Example 7 by using 8.9 parts of 3-chloro-4-isobutyl phenyl acetonitrile, 20 volume parts of ethylene dichloride, 30 volume parts of dimethylsulfoxide and 5.0 parts of 55% sodium hydride. Melting point: 60 to 62° C. Boiling point: 145 to 147° C./2.7 mm. Hg.

*Elementary analysis.*—Calculated for $C_{14}H_{16}NCl$ (percent): C, 71.94; H, 6.90; N, 6.00; Cl, 15.17. Found (percent): C, 72.10; H, 6.75; N, 6.13; Cl, 15.37.

1-(3-chloro-4-isobutyl phenyl)cyclopropane-1 - carboxylic acid is produced after a similar manner to Example 7 by using 3.5 parts of the above produced 1-(3-chloro-4-isobutylphenyl)-1-cyanocyclopropane, 8.0 parts of potassium hydroxide and 50 volume parts of ethylene glycol, followed by recrystallizing from n-hexane. Melting point: 101 to 102° C.

*Elementary analysis.*—Calculated for $C_{14}H_{17}O_2Cl$ (percent): C, 66.53; H, 6.78; Cl, 14.03. Found (percent): C, 66.43; H, 6.79; Cl, 14.41.

EXAMPLE 13

To 6.0 parts of α-(m-chloro-p-cyclohexylphenyl)acrylamide in 100 volume parts of tetrahydrofuran is added slowly under stirring a diazomethane solution in ethylether until yellow color of the resulting solution does not fade away any longer. A small volume of acetic acid is added to the reaction mixture to decompose the excess diazomethane. The resultant is subjected to distillation under reduced pressure to eliminate the solvent, whereby 3-(m-chloro-p-cyclohexylphenyl)-1-pyrazoline-3 - carboxylic amide melting at 150 to 151° C. is obtained.

*Elementary analysis.*—Calculated for $C_{16}H_{20}ClN_3O$ (percent): C, 62.84; H, 6.55; N, 13.74; Cl, 11.59. Found (percent): C, 62.90; H, 6.59; N, 13.92; Cl, 15.51.

3.0 parts of 3-(m-chloro-p-cyclohexylphenyl)-1-pyrazoline-3-carboxylic amide in 60 volume parts of xylene is heated under reflux for 20 minutes, followed by distillation under reduced pressure to remove xylene. The residue is subjected to a column chromatography, whereby 1-(m-chloro-p-cyclohexylphenyl)cyclopropane - 1 - carboxylic amide is obtained. Melting point: 175 to 176° C.

*Elementary analysis.*—Calculated for $C_{16}H_{20}ClNO$ (percent): C, 69.11; H, 7.25; N, 5.04; Cl, 12.76. Found (percent): C, 68.53, H, 7.12; N, 5.03; Cl, 12.92.

A mixture of 4.3 parts of 1-(m-chloro-p-cyclohexylphenyl)cyclopropane-1-carboxylic amide, 50 volume parts of 10% aqueous sodium hydroxide soluion and 50 volume parts of ethanol is heated under reflux on a water bath for 5 hours. After cooling, the resultant is diluted with water and slightly acidified with a diluted hydrochloric acid. This procedure gives 1-(3-chloro - 4 - cyclohexylphenyl)cyclopropane-1-carboxylic acid as crystals melting at 194 to 196° C.

*Elementary analysis.*—Calculated for $C_{16}H_{19}O_2Cl$ (percent): C, 69.73; H, 7.22; Cl, 12.10. Found (percent): C, 68.80; H, 6.94; Cl, 12.73.

EXAMPLE 14

3 parts of 3-(m-chloro-p-cyclohexylphenyl)-1-pyrazoline-3-carboxylic amide in 100 volume parts of benzene is irradiated with a low-pressure mercury lamp for 4 hours, followed by distillation under reduced pressure to remove benzene. The residue is treated as in Example 1 to give 1-(m-chloro-p-cyclohexylphenyl)cyclopropane-1 - carboxylic amide melting at 175 to 176° C.

EXAMPLE 15

To a mixture of 5.0 parts of 1-(3-chloro-4-cyclohexylpropane-1-carboxylic acid in 40 volume parts of ethyl ether is added slowly under stirring diazomethane solution in ethyl ether until yellow color of the resultant does not fade away any longer. The resultant is subjected to distillation under reduced pressure to remove the solvent, whereby 1-(3-chloro-4 - cyclohexylphenyl)cyclopropane-1-carboxylic acid methyl ester is obtained. Melting point: 67 to 68° C.

*Elementary analysis.*—Calculated for $C_{17}H_{21}ClO_2$ (percent): C, 69.73; H, 7.22; Cl, 12.10. Found (percent): C, 69.70; H, 7.18; Cl, 12.14.

EXAMPLE 16

To a mixture of 5.0 parts of 1-(3-chloro-4-cyclohexylphenyl)cyclopropane-1-carboxylic acid and 1.88 part of hydroxylamine hydrochloride in 75 volume parts of pyridine is added slowly 5.57 parts of dicyclohexyl carbodiimide under ice-cooling, followed by keeping standing overnight. Precipitated dicyclohexylurea is removed by filtration, and the filtrate is poured into ice water. The solution is weakly acidified with diluted hydrochloric acid and extracted with benzene. The extract is washed with diluted hydrochloric acid and with water, followed by dehydrating over sodium sulfate. Thus treated extract is then subjected to distillation under reduced pressure to remove benzene, whereby there is obtained 2.3 parts of N-[1-(3-chloro-4-cyclohexylphenyl)cyclopropane-1 - carbonyl]hydroxylamine. Melting point: 169 to 171° C.

*Elementary analysis.*—Calculated (percent): C, 65.41; H, 6.86; N, 4.76; Cl, 12.00. Found (percent): C, 65.51; H, 6.64; N, 4.92; Cl, 12.85.

EXAMPLE 17

To 1.0 part of N,N-dimethylamino ethanol is added wtih stirring under cooling 2.8 parts of powdery 1-(3-chloro - 4 - cyclohexylphenyl) cyclopropane-1-carboxylic acid and further added 20 volume parts of ethyl ether, followed by heating under reflux on a water bath for 10 minutes. The precipitates are collected and washed with ethyl ether, whereby there is obtained 1-(3-chloro-4-cyclohexylphenyl) cyclopropane-1-carboxylic acid N,N-dimethylamino ethanol salt. Melting point: 98 to 103° C.

*Elementary analysis.*—Calculated for $C_{20}H_{30}ClNO_3$ (percent): C, 65.29; H, 8.22; N, 3.81; Cl, 9.64. Found (percent): C, 65.34; H, 8.18; N, 3.52; Cl, 10.17.

What we claim is:

1. A compound of the formula

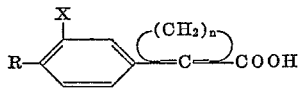

wherein X is hydrogen or halogen, R is cycloalkyl having 3 to 6 carbon atoms and $n$ is an integer of 2 to 5, or its pharmaceutically acceptable alkali or alkaline earth metal salt.

2. A compound as claimed in claim 1, wherein R is cyclohexyl.

3. A compound as claimed in claim 1, wherein the compound is 1-(4-cyclohexyl phenyl) cyclopropane-1-carboxylic acid.

4. A compound as claimed in claim 1, wherein the compound is 1-(3-chloro-4-cyclohexylphenyl) cyclopropane-1-carboxylic acid.

5. A compound as claimed in claim 1, wherein the compound is 1-(3-chloro-4-cyclohexylphenyl) cyclobutane-1-carboxylic acid.

6. A compound as claimed in claim 1, wherein the compound is 1-(3-chloro-4-cyclohexylphenyl) cyclopentane-1-carboxylic acid.

References Cited

UNITED STATES PATENTS

| | | | |
|---|---|---|---|
| 3,674,832 | 7/1972 | Sherlock et al. | 260—469 |
| 3,160,653 | 12/1964 | Benning et al. | 260—465 |
| 3,083,204 | 3/1963 | Klavehn et al. | 260—465 X |
| 3,413,309 | 11/1968 | Makosza et al. | 260—466 X |
| 3,457,300 | 7/1969 | Dorn et al. | 260—515 |
| 3,526,653 | 9/1970 | Shen et al. | 260—515 |

FOREIGN PATENTS

| | | | |
|---|---|---|---|
| 585,729 | 2/1947 | Great Britain | 260—515 |

OTHER REFERENCES

Gotkis et al., J. Am. Chem. Soc., vol. 56, pp. 2710–2712 (1934).

Case, J. Am. Chem. Soc., vol. 56, pp. 715–717 (1934).

Rubin et al., J. Am. Chem. Soc., vol. 68, pp. 828–832 (1946).

Tilford et al., J. Am. Chem. Soc., vol. 69, pp. 2902–2906 (1947).

Wieland et al., Ann. Der Chem., vol. 530, pp. 274 and 288 to 290 (1937).

FLOYD D. HIGEL, Primary Examiner

U.S. Cl. X.R.

260—247, 268 R, 286 R, 290 R, 293.51, 310 D, 326.8, 465 R, 465 G, 476 R, 477, 500.5 H, 501.1, 501.16, 558 R, 566 R, 999; 424—304, 317